Jan. 4, 1955 R. W. DOUGHERTY ET AL 2,698,574
APPARATUS FOR BONDING NONWOVEN WEBS
Filed July 11, 1951 2 Sheets-Sheet 1
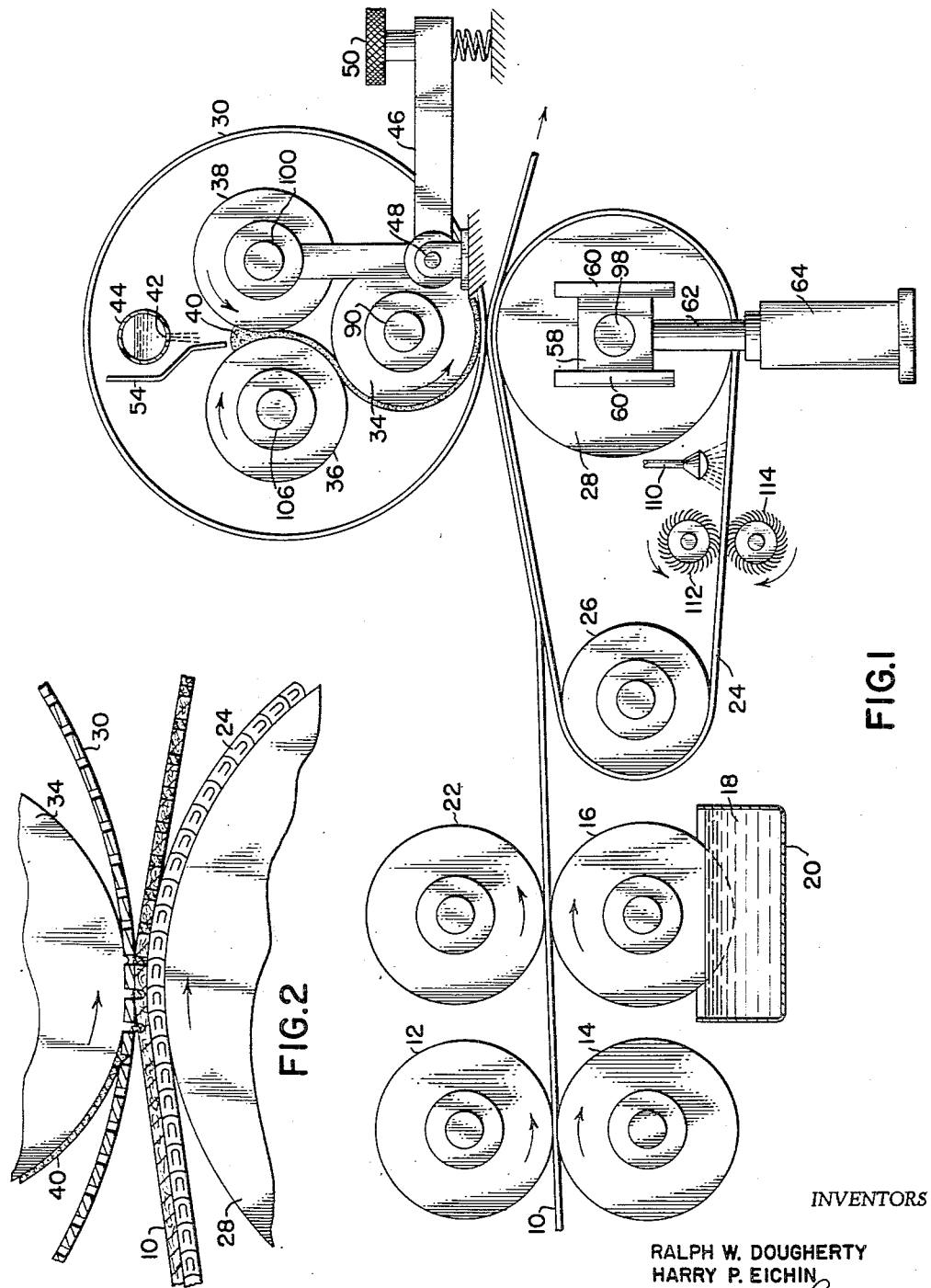
INVENTORS
RALPH W. DOUGHERTY
HARRY P. EICHIN
BY *Harry H. Levin*
ATTORNEY Jan. 4, 1955 R. W. DOUGHERTY ET AL 2,698,574
APPARATUS FOR BONDING NONWOVEN WEBS
Filed July 11, 1951 2 Sheets-Sheet 2
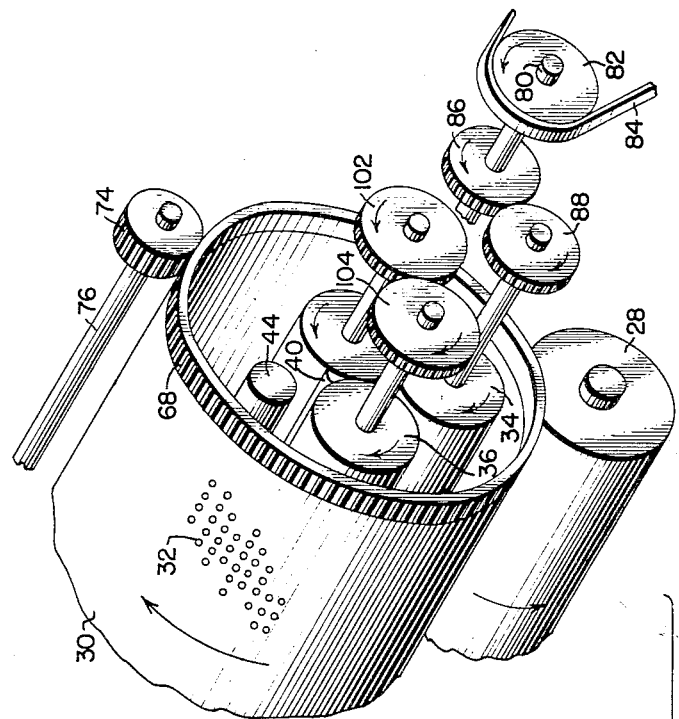
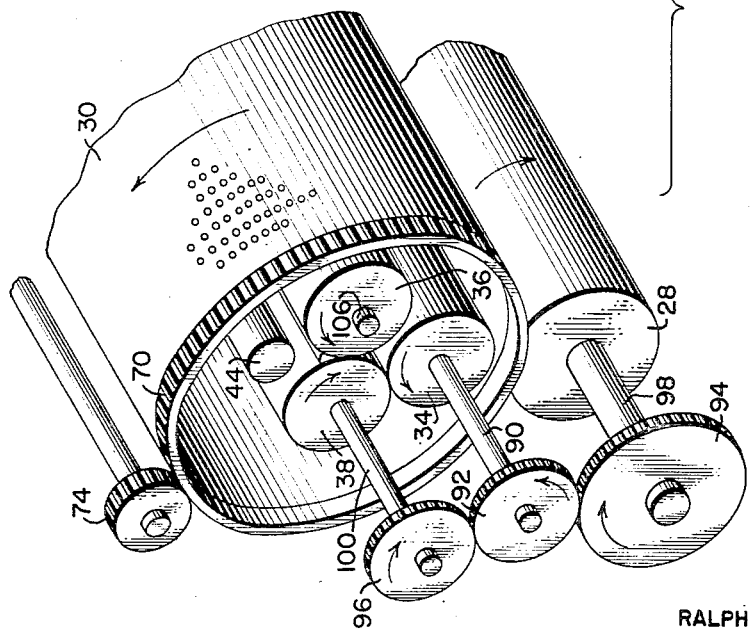
FIG. 3
INVENTORS
RALPH W. DOUGHERTY
HARRY P. EICHIN
BY *Harry H. Levin*
ATTORNEY

United States Patent Office 2,698,574
Patented Jan. 4, 1955

2,698,574

APPARATUS FOR BONDING NONWOVEN WEBS

Ralph W. Dougherty, Little Rock, and Harry P. Eichin, North Little Rock, Ark., assignors to The Visking Corporation, Chicago, Ill., a corporation of Virginia Application July 11, 1951, Serial No. 236,125

3 Claims. (Cl. 101—120)

This invention relates to nonwoven fabrics. More particularly, it relates to a new and improved method of and apparatus for bonding nonwoven webs.

Unwoven fiber webs have been produced by carding, garnetting, air laying, water laying, etc., of unspun fibers. Such unwoven webs are very weak and have very little, if any, tensile strength. It has been the practice to bond the fibers in the webs in configurations which were interconnecting to produce nonwoven fabrics. Such nonwoven fabrics had a degree of stiffness and lack of hand and drape required for certain applications. As a consequence, the field of use of such nonwoven fabrics was restricted.

To provide nonwoven fabrics of greater flexibility as well as better drape and hand, it has been proposed to bond the nonwoven webs locally, i. e., discontinuously by islands or discrete areas of bonding agent, such bonding also being known as spot or pattern bonding. In one procedure, a web of unspun fibers was imprinted with the bonding agent by a printing roll, the periphery of which was in the form of a grid of crisscrossing dull-edged blades. Another procedure contemplated imprinting the nonwoven fibrous web with a bonding agent by means of an engraved printing roll. In both of the aforementioned procedures, the bonding agent was applied to the printing roll by a transfer roll supplied either directly or through the medium of another roll with the bonding agent. Also, in both of the aforementioned procedures the printing roll cooperated with a backing-up member, in the form of a roll or apron, which was not readily permeable to air or liquids, and as a consequence it was exceedingly difficult to make the bonding agent penetrate into and extend throughout the thickness of the web. The pressure produced by the printing roll and the backing-up element created conditions in the web which prevented displacement of the air in the web by the bonding agent and obtaining a clean-cut pattern throughout the thickness of the web. This was especially true when the bonding agent was applied in a viscous state.

An object of this invention is to provide a new and improved method of and apparatus for spot-bonding webs of unspun fibers.

Another object of this invention is to provide a method of and apparatus for producing spot-bonded webs of unspun fibers wherein the bonding agent extends throughout the thickness of the web.

A further object of this invention is to provide a method of and apparatus for applying a viscous bonding agent in the spot-bonding of webs of unspun fibers.

Other and additional objects will become apparent hereinafter.

The objects of this invention are accomplished, in general, by supporting the web of unspun fibers on a support which is readily permeable to air and liquids, and while so supported applying the bonding agent in accordance with a desired pattern and under pressure to the web whereby the air in the web and fibers is displaced by the bonding agent and the bonding agent extends throughout the thickness of the web. Thereafter, the bonding agent is set or fixed in the web, the precise procedure depending on the nature of the bonding agent.

The air and liquid-permeable support, in one form of the invention, consists of a woven mesh link continuous belt arranged to travel in a defined path, including passing beneath the bonding agent applying means and over a roll which also functions as a backup roll. A stencil of the desired pattern, and preferably in the form of a hollow cylinder, is disposed in cooperative relationship with the backup roll and means such as, for example, an applicator roll positioned in the interior of the stencil cylinder, is provided to receive a metered quantity of bonding agent and force it by a pumplike action through the stencil opening onto and throughout the depth of the web. The applicator roll is provided with a resilient surface and is arranged to ride on the inner periphery of the stencil cylinder. Two rolls are arranged within the stencil cylinder to provide above the nip thereof a well for the bonding agent. One of such rolls is in contact with the applicator roll and functions also as a transfer roll whereby the bonding agent is applied to the applicator roll. Means are provided to adjust the rolls relative to each other whereby the quantity of bonding agent applied to the transfer roll is controlled. An intermittently-acting pump supplies the bonding agent to the well and the operation of such pump, together with the depth of the well, is controlled by an electrode probe depth controller suspended in the well of the bonding agent.

The web is fed and conveyed through the apparatus in a manner which imposes no appreciable tension to the tenuous and weak web. In general, the web is maintained sufficiently taut so that it can pass through the apparatus without sagging.

Preferably, the web is also treated, prior to the bonding operation, so that it can be handled better. For example, the web may be subjected to pressure to compress and densify the web. Also, the web may be subjected to a wetting-out, preferably with a liquid which is missible with the liquid vehicle of the bonding agent composition.

The web of unspun fibers may be produced in any known manner, such as, by carding, garnetting, air laying, water laying, etc., of the selected fibers or mixture of fibers, and it may consist of a single ply or a plurality of superimposed plies. When the web consists of a multi-ply structure, the fibers of the respective webs may be the same or different. The fiber-lay in the web may be oriented or random. In multi-ply structures wherein the fibers are oriented, the lay of the fibers in adjacent plies may be at right angles to each other. For webs of unspun fibers produced by carding or garnetting, textile fibers are preferred. When the web is produced by water or air laying, any fiber may be used. Depending on the process of producing the web any of the following fibers, either alone or in combination with others, may be used: cotton, cellulose acetate, rayon, proteinous fibers, hemp, ramie, silk, kapok, vinyon, saran, fibers formed from dicarboxylic acids and diamines (nylon type), fibers of copolymers of vinyl halide and vinyl acetates, copolymers of vinyl halide and acrylic acid derivative, polyacrylonitrile, fibers of polyesters derived from terephthalic acid ethylene glycol, etc.

In general, when textile fibers are used, the length thereof should be at least ¼". In the preferred embodiment of the invention, ⅞" cotton staple, rayon staple 1¹⁹⁄₁₆" long and of 1½ denier, or mixtures of such cotton and rayon staples are used.

Any bonding agent can be used. In general, the bonding agent used depends on the nature of the fibers constituting the web and the ultimate use of the product. Starch, gum arabic, algenates, pectinates, casein, gelatine, albumen, shellac, rubber, latex, synthetic rubbers, vinyl acetate, polyvinyl alcohol, polyvinyl acetate, copolymer of vinyl halide and vinyl acetate, cellulose acetate, cellulose nitrate, cellulose ether, viscose, etc., are illustrative examples of bonding agents which can be used. Preferably, the bonding agent is applied in the form of an emulsion or solution and the liquid vehicle after application is dissipated by evaporation or the like to set the bonding agent. In the embodiment of the invention, wherein the nonwoven webs are formed of cotton or rayon staple or mixtures thereof, viscose is the preferred bonding agent and after application it is regenerated whereby the bond consists of regenerated cellulose.

The spots of bonding agent may be of any configuration. They may be lines, either straight, curved or intersecting, or any plain geometric figure, such as, for example, circles, triangles, crescents, squares, rectangles, trapezoids, parallelograms, arranged in any desired pattern. If desired, two or more different configurations can be used. The sizes of the spots are not critical. In general, the smaller the area of the surface of the spots and the greater the distance between them, the greater the flexibility of the product. However, in order to assure bonding of all fibers, the maximum spacing between the spots should be slightly less than the average maximum length of the fibers.

The nature of the invention and the manner in which it may be practiced will become clear from the following detailed description when taken in conjunction with the accompanying drawings forming a part of this specification and wherein, Figure 1 is a diagrammatic side elevation of an illustrative apparatus embodying the principles of this invention;

Figure 2 is an enlarged detail illustrating the application of the bonding agent, and Figure 3 is a perspective view broken to show both ends of the bonding applying means, together with the back-up roll, the support being omitted for convenience.

Referring now to the drawings wherein like reference numerals designate like elements in parts, the reference numeral 10 designates a nonwoven web of carded cotton fibers fed in any convenient manner from the place where it is produced, not shown, and caused to pass between a pair of calender rolls 12 and 14 whereby the thin, flimsy, weak web is compressed and densified.

The compressed and densified web can be disposed on an air and liquid permeable belt and subjected to the bonding agent applying means (both hereinafter more fully described) but in the preferred form of the invention the web is wetted out, prior to such treatments, and the fibers thereof caused to adhere into a compact web. With this in view, the web is fed over a water-applying roll 16 partly submerged in a bath of water 18 in tank 20. Squeeze roll 22 cooperates with roll 16 and upon adjustment, in any known manner relative to roll 16, will control the quantity of moisture impregnated into the web and cause the fibers in the web to cohere into a compact mass. Rolls 16 and 22 are both positively driven at the same peripheral speed and preferably the peripheral surface of each is formed of 50 to 60 durometer rubber which has been provided with rugosities. In the preferred form of the invention, the web is impregnated with 500% to 700% of moisture, based on the dry web.

The dampened web, after leaving the water-wetting rolls 16 and 22, is then laid on continuous belt 24 which runs over rolls 26 and 28. Belt 24 is normally readily permeable to air and liquids, and in the form shown, it is a woven mesh link belt. Roll 28 also functions as a backup roll and is disposed in cooperative relation to stencil cylinder 30, and as shown, the top of roll 28 is in juxtaposition to the bottom of cylinder 30.

The upper flight of belt 24 extends in an upwardly inclined plane. In this arrangement, web 10 passes from water wetting rolls 16 and 22 and after traveling for a relatively short distance in a substantially horizontal plane engages and is received by the upper flight of belt 24 on which it is deposited without imposing an undue tension thereon and then conveyed through the zone of action of stencil cylinder 30. It is to be noted that the horizontal path of web 10 is in a plane above the beginning of the upper flight.

Stencil cylinder 30 is hollow and its peripheral wall is provided with perforations 32 of the size, shape and arrangement in accordance with the desired size, shape and pattern of the spot bonds in the finished product.

An applicator roll 34, as will hereafter be more fully explained, forces the bonding agent through perforations 32 of stencil cylinder 30 into and throughout the depth of web 10.

The bonding agent is supplied to applicator roll 34 by roll 36 tangentially disposed with respect thereto and which cooperates with roll 38 to provide well 40 above the nip thereof and into which the bonding agent is supplied through orifices 42 in header 44. Rolls 36 and 38 constitute a metering device whereby the desired quantity of bonding agent is transferred to the applicator roll 34.

Roll 38 is adjustable relative to roll 36 with the result that the quantity of bonding agent delivered by roll 38 to applicator roll 34 can be adjusted and controlled. In the form shown, the adjustment of roll 38 is obtained through movement of lever 46 pivoted at 48 and cooperating with the bearings for the shaft of roll 38. A vernier adjustment 50 is provided for manual operation whereby lever 46 can be appropriately moved to obtain the desired adjustment of roll 38.

The supply of the bonding agent to the well 40 from header 44 is controlled by a well-known, intermittently active pump, not shown, actuated in response to an electronic probe depth controller 54, of a known type, suspended in the well of bonding agent. This arrangement also serves to maintain a substantially constant level of bonding agent within the well.

Roll 28 is mounted on shaft 98 which, in turn, is mounted in bearings 58, slidably disposed between the pair of guide rails 60. The bearings 58 are mounted on one end of piston rod 62 of a hydraulically operated piston within the chamber 64. By appropriate manipulation of the hydraulic medium, roll 28 can be adjusted relative to roll 30.

Calender rolls 12 and 14, the wetting rolls 16 and 18 and the belt 24 are driven at the same peripheral speed so that the web is not subjected to any appreciable tension but is maintained in a relatively taut condition. Stencil cylinder 30 is provided with ring gears 68 and 70 adjacent each end thereof and which are driven by gears 72 and 74, respectively, mounted on a shaft 76, driven in any suitable manner. In general, the peripheral speed of stencil roll 30 is approximately the same as the linear rate of travel of the web.

The drive mechanism for the metering rolls 36 and 38, applicator roll 34 and backup roll 28 will now be described. Referring now to Figure 3, the reference numeral 80 designates a shaft provided with a pulley 82 which is driven by a belt 84 from any suitable source of supply, not shown. A gear 86 on shaft 80 meshes with a gear 88 on one end of shaft 90. On the other end of the shaft 90 is a gear 92 which meshes with gears 94 and 96. Gear 94 is mounted on shaft 98 on which the backup roll 28 is mounted. Gear 96 is mounted on one end of shaft 100 on which roll 38 is mounted. On its opposite end shaft 100 is provided with a gear 102, which meshes with gear 104, on shaft 106, on which roll 36 is mounted.

Rolls 34, 36 and 38 are driven at speeds such that the bonding agent will be applied to the applicator roll 34 and it, in turn, will apply it to the web through the stencil.

In the embodiment shown, roll 34 is provided with a resilient covering, such as, approximately 20 durometer rubber and metering rolls 36 and 38 and backup roll 28 are provided with coverings of approximately 60 durometer rubber.

Referring now to Figure 2, it will be noted that the film of metered bonding agent is fed into and through the perforations of stencil cylinder 30 under pressure by a plunger action of the soft rubber surface of the applicator roll 34. When the applicator roll 34 exerts its plunger-type action in forcing the bonding agent through the apertures and into the web, the air and/or liquid in the web is displaced by the bonding agent through the interstices of the gas and liquid permeable support whereby the bonding agent extends throughout the thickness of the web.

In the aforementioned operation, some of the bonding agent may adhere to the belt 24. In order to maintain the belt 24 clean, the lower flight thereof passes beneath spray 110 which applies a liquid medium appropriate for the removal of any adhering bonding agent. A pair of rotating brushes 112 and 114 adapted to engage belt 24 after being subjected to spray 110 also aid in cleansing the belt.

In the embodiment herein described, the bonding agent consists of viscose, and after the bonding agent has been applied, the web is subjected to known treatments for the regeneration of cellulose from viscose.

The air and liquid penetrable belt is not restricted to the precise form described. The belt can be made of any material which at the impregnating point will afford sufficient permeability to release air and/or liquid during the impregnating operation. In addition, the belts should preferably also be chemically inert to the bonding agent and be flexible and relatively smooth as well as substantially nonadherent to the bonding agent. Belts made of woven glass fiber belting, plastic and metal screening, rubber, etc., are additional examples of belts which can be used.

Though the upper flight of belt 24 preferably extends in an upwardly inclined plane, such arrangement is not necessary to the practical operation of the apparatus. The upper flight of belt 24 can extend horizontally or in a downwardly inclined plane.

The surfaces of the various rolls need not be made of the precise material herein described. The liquid-wetting rolls can be made of any material which will apply the desired liquid for the prewetting operation and, in general, depends upon the nature of the liquid. The applicator roll should be resilient so that it can produce the plunger-like action in cooperation with the stencil roll in the application of the bonding agent. Because of the effect of the soft rubber roll expressing the bonding agent under pressure to the web, there is obtained a self-cleaning of the imprinting pattern of the stencil media.

Though in the preferred form a stencil cylinder is used, the invention is not restricted thereto. The stencil can be in any other suitable form, such as a belt.

The specific medium employed in the wetting-out treatment depends on the liquid medium of the bonding agent composition. In general, it should be miscible with the liquid vehicle of the bonding agent composition and capable of being dissipated in the same manner as such liquid vehicle.

The invention provides an apparatus for and method of continuously producing spot or pattern bonded nonwoven fabrics in which the bonding agent extends throughout the depth or thickness of the web. The apparatus is relatively simple in construction and easy to operate to carry out the method.

Since it is obvious that various changes and modifications can be made in the above description without departing from the nature and spirit thereof, this invention is not restricted thereto except as set forth in the appended claims.

We claim:

1. An apparatus for producing spot or pattern bonded nonwoven fabrics comprising an air-permeable continuous belt traveling in a defined path, means to feed a nonwoven web onto said belt, a rotating backup roll cooperating with said belt, a rotating hollow stencil cylinder disposed in cooperative relationship with said backup roll, a rotating applicator roll disposed within and in contactual relationship with said stencil cylinder, said applicator roll having a resilient peripheral surface to force under pressure by plunger action of said resilient surface a bonding agent through the stencil openings and displace the air in said web through said support whereby said bonding agent extends throughout the depth of said web and means to supply the bonding agent to said applicator roll comprising a pair of rolls disposed within the stencil cylinder to provide a well above the nip therebetween, means to supply bonding agent to said well, one of said rolls being positioned to transfer the bonding agent to said applicator roll and means to adjust the other of said rolls to control the quantity of bonding agent transferred to said applicator roll.

2. An apparatus as set forth in claim 1 having means to maintain the level of the bonding agent in the well at a predetermined height.

3. An apparatus for producing spot or pattern bonded nonwoven fabrics comprising an air-permeable continuous belt traveling in a defined path with the upper flight thereof being in an upwardly inclined direction, means to feed a nonwoven web in a horizontal direction above the lower end of said upper flight until said web is engaged by and laid on said upper flight, a rotating backup roll cooperating with said belt, a rotating hollow stencil cylinder disposed in cooperative relationship with said backup roll, a rotating applicator roll disposed within and in contactual relationship with said stencil cylinder, said applicator roll having a resilient peripheral surface for forcing a bonding agent through the stencil openings and into and through the depth of said web, a pair of rolls constituting metering rolls disposed within said stencil cylinder and providing a well above the nip therebetween, means to supply bonding agent to said well, means to maintain the level of the bonding agent in said well, one of said metering rolls transfering the bonding agent to said applicator roll, and means to adjust the other of said metering rolls to control the quantity of bonding agent transferred to said applicator roll.

References Cited in the file of this patent

UNITED STATES PATENTS

| Number | Name | Date |
|---|---|---|
| 1,101,951 | Oliva | June 30, 1914 |
| 1,495,146 | Ariente | May 27, 1924 |
| 1,516,557 | Wood | Nov. 25, 1924 |
| 1,675,442 | Zeitinger | July 3, 1928 |
| 2,003,544 | Jordhoy | June 4, 1935 |
| 2,049,495 | Freuder | Aug. 4, 1936 |
| 2,084,827 | Schwartz | June 22, 1937 |
| 2,180,135 | Bartholomew | Nov. 14, 1939 |
| 2,275,514 | Dudley | Mar. 10, 1942 |
| 2,359,825 | Campbell | Oct. 10, 1944 |
| 2,419,695 | Shuttleworth | Apr. 29, 1947 |